May 17, 1960 A. CAMERON-JOHNSON 2,936,633
SWASHPLATE CAM FOLLOWER ROD
Filed July 19, 1957
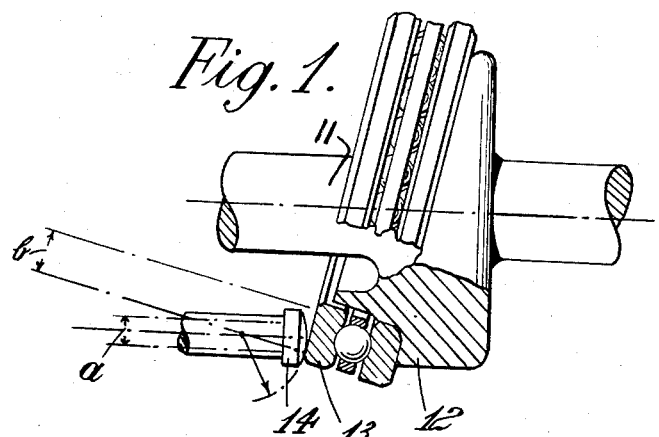
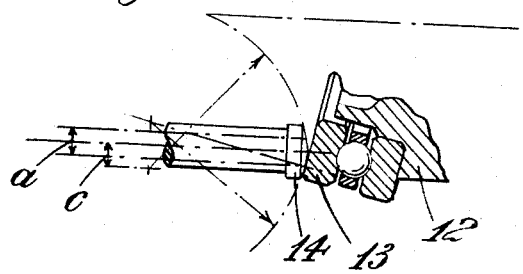
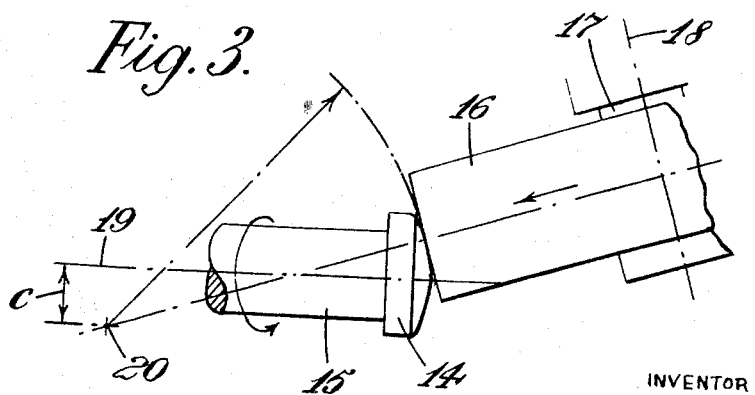
INVENTOR
Alan Cameron-Johnson
By
Watson, Cole, Grindle & Watson
ATTORNEYS

United States Patent Office 2,936,633
Patented May 17, 1960

2,936,633

SWASHPLATE CAM FOLLOWER ROD

Alan Cameron-Johnson, Gloucester, England, assignor to British Messier Limited, Gloucester, England, a British company Application July 19, 1957, Serial No. 673,059

Claims priority, application Great Britain July 31, 1956

3 Claims. (Cl. 74—60)

This invention relates to pistons or plungers for fluid pumps and motors of the swashplate type.

It is common practice in fluid pumps and motors of this type to form the ends of the pistons or plungers that bear on the swashplate as heads with convex spherical surfaces making contact with a flat surface of the swashplate. Where the swashplate is a standard ball thrust-bearing the width of the thrust face is necessarily limited. Since the piston contact-head radius should be such as to maintain proper tangential contact with this face at all points during the working stroke, this, in most cases, necessitates a small piston contact-head radius. However, in a heavily loaded unit the contact stresses can become dangerously high if a small radius is employed, and it would be preferable if a larger radius could be provided.

It is the object of this invention to reconcile these criteria and provide a piston contact-head affording a surface curvature with a large effective radius while at the same time the contact path with respect to the swashplate is maintained as with the smaller radius of head.

According to the present invention, the surface of the piston or plunger contact-head which bears on the swashplate is generated with a constant radius of curvature but has a moving centre of curvature which travels in a circle around the longitudinal axis of the piston as centre in a plane normal to said longitudinal axis.

This gives a contact surface with an ogival cross section rather like a shallow "Gothic Arch," or the surface generated might be described as a shallow cone which is bulged or distorted so that it has convex sides.

A means of carrying the invention into effect will now be described by way of example, reference being made to the accompanying drawings, of which:

Figure 1 shows a conventional piston in contact with a typical swashplate,

Figure 2 shows a modified piston in accordance with the invention, and

Figure 3 shows the manner in which the modified piston can be produced.

Figure 1 shows the disadvantage inherent in the conventional arrangement. In Figure 1 there is a shaft 11 which carries a swashplate 12 supporting a ball race 13 on which bear piston heads 14. At *a* is shown the diameter of the contact circle on the piston contact-head within which contact with the swashplate takes place, and at *b* the corresponding area of contact described by the piston on the swashplate during a relatively large number of revolutions. From this figure it will be seen that by increasing the piston contact-head radius the swashplate path will be increased to the extent that it will demand an increase in swashplate width if proper tangential contact is to be made, which is not acceptable.

Figure 2 shows method of obtaining a large contact-head radius without a corresponding increase in swashplate path of contact. The piston contact-head radius is generated from a varying centre not on the piston centre line, but displaced from it at a distance *c* and rotating around it so that the normal to the swashplate face at any point of contact passes through this moving centre. Broadly speaking the profile of the piston contact-head is now a cone distorted to have a convex ogival section, rather like a "Gothic Arch."

It will be understood that this shape lies between the purely spherical surface and the purely conical form, and compared with both of these it has the following advantages: The radius of curvature of the contact-head 14 at the point of contact is greater and therefore the surface stresses are lower than in the case of a pure spherical surface of similar radius, while a known contact condition is obtained between the head and the swashplate, whereas contact between a cone and a flat is indeterminate and depends upon angular tolerances, as well as giving, in the case of accurate line contact, a scrubbing action due to the difference in velocities along this line. This improvement in the contact condition is obtained without any increase in space requirements, or change in swashplate design.

The loaded area of contact between contact-head and swashplate is no longer circular but is of some form approaching elliptical due to the fact that the piston head consists of a non-spherical surface. The generated radius, and any section through the distorted cone on a plane containing the longitudinal axis of the piston, determines the shape of any other section through the piston contact-head.

This shape, although apparently complex, is easily produced either by a formed grinding wheel or tool or by swinging a plain wheel or tool around a fixed point on the machine, having a relationship to the work such that the radius required is generated, the work being rotated in the normal way. In this manner a fine finishing operation can be performed to give the required surface quality.

Figure 3 illustrates a typical manufacturing process and also shows more clearly the geometrical form of the piston contact-head. The piston 15 constituting the workpiece is mounted for rotation about its longitudinal axis in the usual manner, and the contact surface on head 14 is shaped by a plain grinding wheel 16 mounted to rotate on an arbor 17 that has its axis 18 in a plane containing the longitudinal axis 19 of the piston. The axis of the grinding wheel arbor makes an angle of something less than a right angle with the piston axis, and during the grinding the whole unit of grinding wheel and arbor is made to swing angularly to and fro in the plane containing said axes about a centre 20 in said plane some distance behind the contact-head 14 on the piston and off-set from the piston axis by the distance *c*.

I claim:

1. For a swashplate mechanism of the kind having a swashplate and a reciprocating member having a contact head abutting against said swashplate; a reciprocating member having a contact-head of which the surface which bears on the swashplate is convex, is of ogival section, and is generated with a constant radius of curvature but has a moving center of curvature which travels in a circle around the longitudinal axis of said reciprocating member and in a plane normal to said longitudinal axis.

2. For a swashplate mechanism of the kind having a reciprocating member and a swashplate reciprocating the reciprocating member; a reciprocating member having one end with a shaped surface to abut the swashplate, said shaped surface being convex, of ogival section, and generated with a constant radius of curvature centered on points the locus of which is a circle centered on the axis of said reciprocating member and lying in a plane normal to said axis of said reciprocating member.

3. A swashplate mechanism comprising a swashplate and a reciprocating member having a contact surface for abutting said swashplate wherein said contact surface is convex, is of ogival section, and is generated with a constant radius of curvature centered on points, the locus of which is a circle centered at the axis of the reciprocating member and lying on a plane perpendicular to the axis of the reciprocating member.

References Cited in the file of this patent

UNITED STATES PATENTS

| | | |
|---|---|---|
| 1,746,335 | Boyce | Feb. 11, 1930 |
| 2,232,984 | Wahlmark | Feb. 25, 1941 |
| 2,722,890 | Lucien | Nov. 8, 1955 |

FOREIGN PATENTS

| | | |
|---|---|---|
| 817,295 | France | Aug. 31, 1937 |
| 842,400 | France | June 12, 1939 |
| 46,477 | Netherlands | July 16, 1939 |